United States Patent
Torii

(10) Patent No.: US 12,210,991 B2
(45) Date of Patent: Jan. 28, 2025

(54) INFORMATION PROCESSING DEVICE, INFORMATION PROCESSING SYSTEM, AND INFORMATION PROCESSING METHOD

(71) Applicant: SONY GROUP CORPORATION, Tokyo (JP)

(72) Inventor: Kuniaki Torii, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 226 days.

(21) Appl. No.: 17/310,547

(22) PCT Filed: Jan. 10, 2020

(86) PCT No.: PCT/JP2020/000665
§ 371 (c)(1),
(2) Date: Aug. 10, 2021

(87) PCT Pub. No.: WO2020/170644
PCT Pub. Date: Aug. 27, 2020

(65) Prior Publication Data
US 2022/0108245 A1   Apr. 7, 2022

(30) Foreign Application Priority Data
Feb. 19, 2019 (JP) .................... 2019-027830

(51) Int. Cl.
*G06Q 10/06* (2023.01)
*G06Q 10/0631* (2023.01)
(Continued)

(52) U.S. Cl.
CPC . *G06Q 10/06315* (2013.01); *G06Q 10/06393* (2013.01); *G06Q 10/06395* (2013.01); *B66B 1/3461* (2013.01)

(58) Field of Classification Search
CPC ........................................ G06Q 10/00–90/00
See application file for complete search history.

(56) References Cited

U.S. PATENT DOCUMENTS

| | | | |
|---|---|---|---|
| 2012/0041593 A1* | 2/2012 | Ichinose ............... | B66B 1/2458 700/258 |
| 2013/0184980 A1* | 7/2013 | Ichikawa ................ | G05D 1/02 701/301 |

(Continued)

FOREIGN PATENT DOCUMENTS

| | | |
|---|---|---|
| CN | 103119529 A | 5/2013 |
| CN | 109789997 A | 5/2019 |

(Continued)

OTHER PUBLICATIONS

International Search Report and Written Opinion of PCT Application No. PCT/JP2020/000665, issued on Mar. 31, 2020, 08 pages of ISRWO.

*Primary Examiner* — Arif Ullah
(74) *Attorney, Agent, or Firm* — CHIP LAW GROUP

(57) ABSTRACT

Implemented is a configuration for deciding a transport machine into which a robot get, by taking efficiency and cooperativeness into consideration. A data processing section that selects a transport machine to be taken by a robot is included. The data processing section acquires robot information that is about the robot and transport-machine information that is about the transport machine, calculates scores corresponding to a plurality of available transport machines on the basis of the acquired information, and selects a transport machine to be used on the basis of the calculated scores. In a case where two or more transport machines satisfy a physical condition for permitting the robot to take the transport machines, the data processing section calculates an efficiency calculation value and a cooperativeness calculation value based on the robot infor- (Continued)

mation and the transport-machine information, and calculates scores on the basis of a function using the calculated efficiency calculation value and the calculated cooperativeness calculation value.

17 Claims, 11 Drawing Sheets

(51) Int. Cl.
  *G06Q 10/0639* (2023.01)
  *B66B 1/34* (2006.01)

(56) References Cited

U.S. PATENT DOCUMENTS

2015/0127148 A1\* 5/2015 Koyanagi .......... G05B 19/4183
 700/248
2019/0219409 A1\* 7/2019 Tan ...................... G05B 19/048

FOREIGN PATENT DOCUMENTS

| JP | 2004-126800 A | 4/2004 | |
|----|---------------|--------|---|
| JP | 2012-017184 A | 1/2012 | |
| KR | 10-2012-0005397 A | 1/2012 | |
| WO | 2012/039280 A1 | 3/2012 | |
| WO | WO-2018066057 A1 \* | 4/2018 | ............... B66B 1/14 |

\* cited by examiner

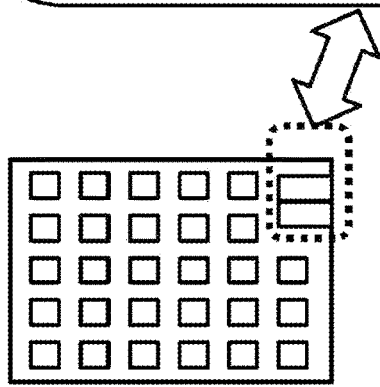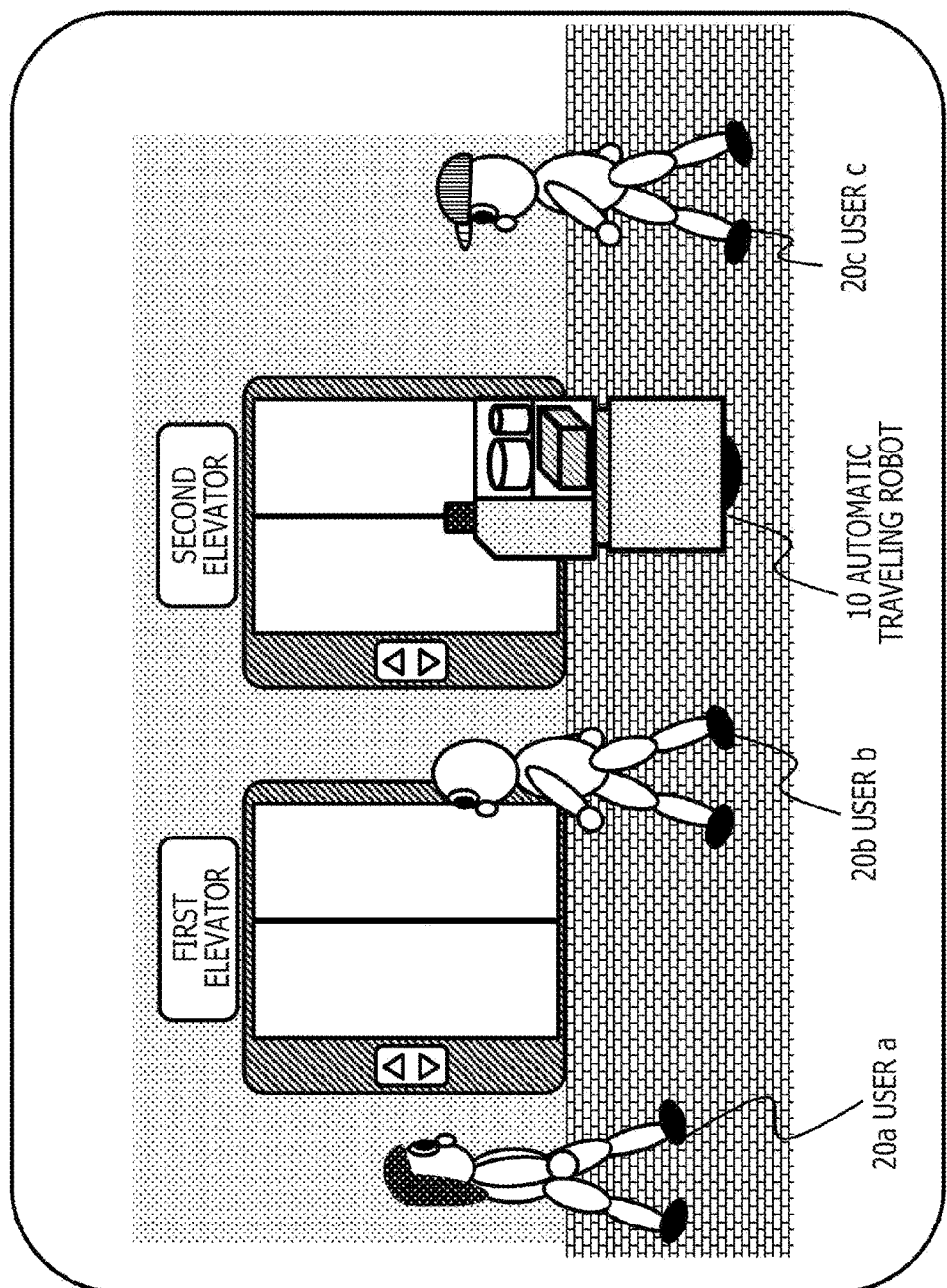
FIG. 1

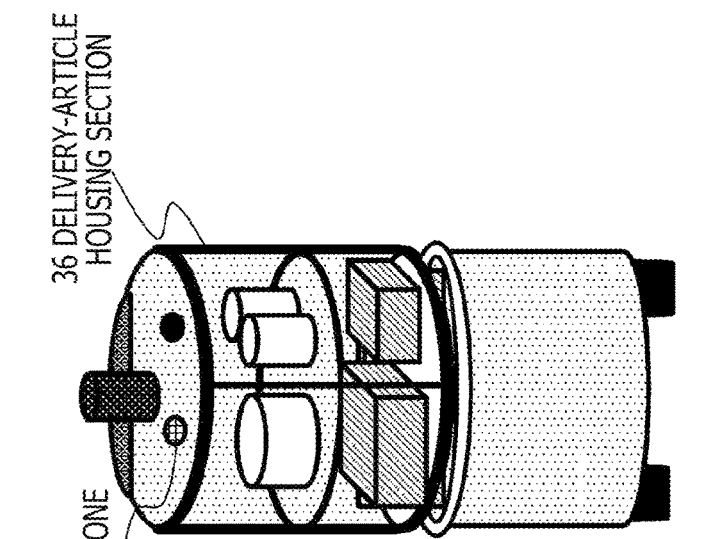
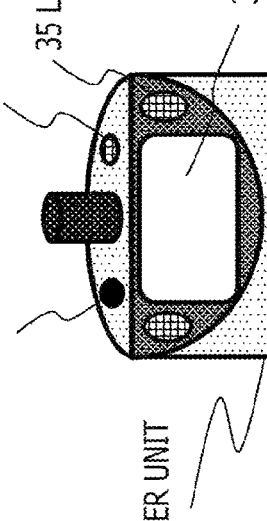

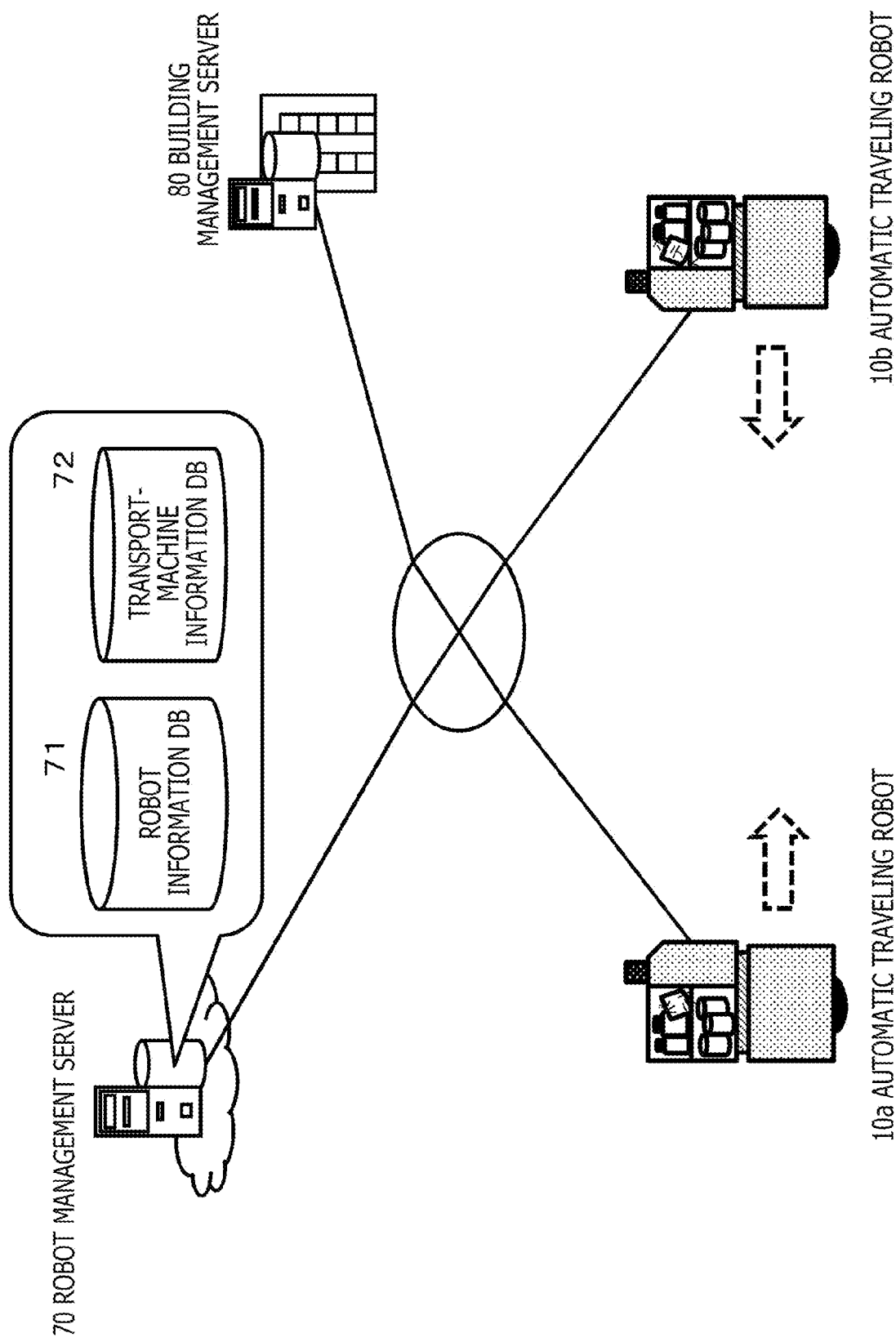

| | (a) ROBOT INFORMATION | (b) SPECIFIC EXAMPLES |
|---|---|---|
| (1) | MOVEMENT INFORMATION | MOVEMENT DIRECTION, FLOOR AT WHICH STOP IS MADE, ETC. |
| (2) | WEIGHT INFORMATION | OWN WEIGHT, WEIGHT OF LOAD, ETC. |
| (3) | OCCUPATION REGION INFORMATION | LENGTH IN EACH DIRECTION IN THREE DIMENSIONS (x, y, z), ETC. |
| (4) | EXTERNAL APPEARANCE INFORMATION | PRESENCE/ABSENCE OF DIRT, PROTRUDING OBJECT, ETC. |
| (5) | ROUTE INFORMATION | DESTINATION, FLOOR TO BE USED, SCHEDULED REQUIRED TIME, ETC. |
| ‥ | ‥ | ‥ |

| | (a) TRANSPORT-MACHINE INFORMATION | (b) SPECIFIC EXAMPLES |
|---|---|---|
| (1) | MOVEMENT INFORMATION | MOVEMENT DIRECTION, FLOOR AT WHICH STOP IS MADE, ETC. |
| (2) | WEIGHT INFORMATION | WEIGHT OF OCCUPANT, WEIGHT OF BAGGAGE, ETC. |
| (3) | OCCUPATION REGION INFORMATION | INFORMATION ABOUT OCCUPIED SPACE IN TRANSPORT MACHINE (INFORMATION INDICATING WHETHER OR NOT ROBOT CAN GET INTO MACHINE) |
| (4) | OCCUPANT INFORMATION | PRESENCE/ABSENCE OF CHILD, PRESENCE/ABSENCE OF WHEELCHAIRED PERSON, ETC. |
| . . | . . | . . |

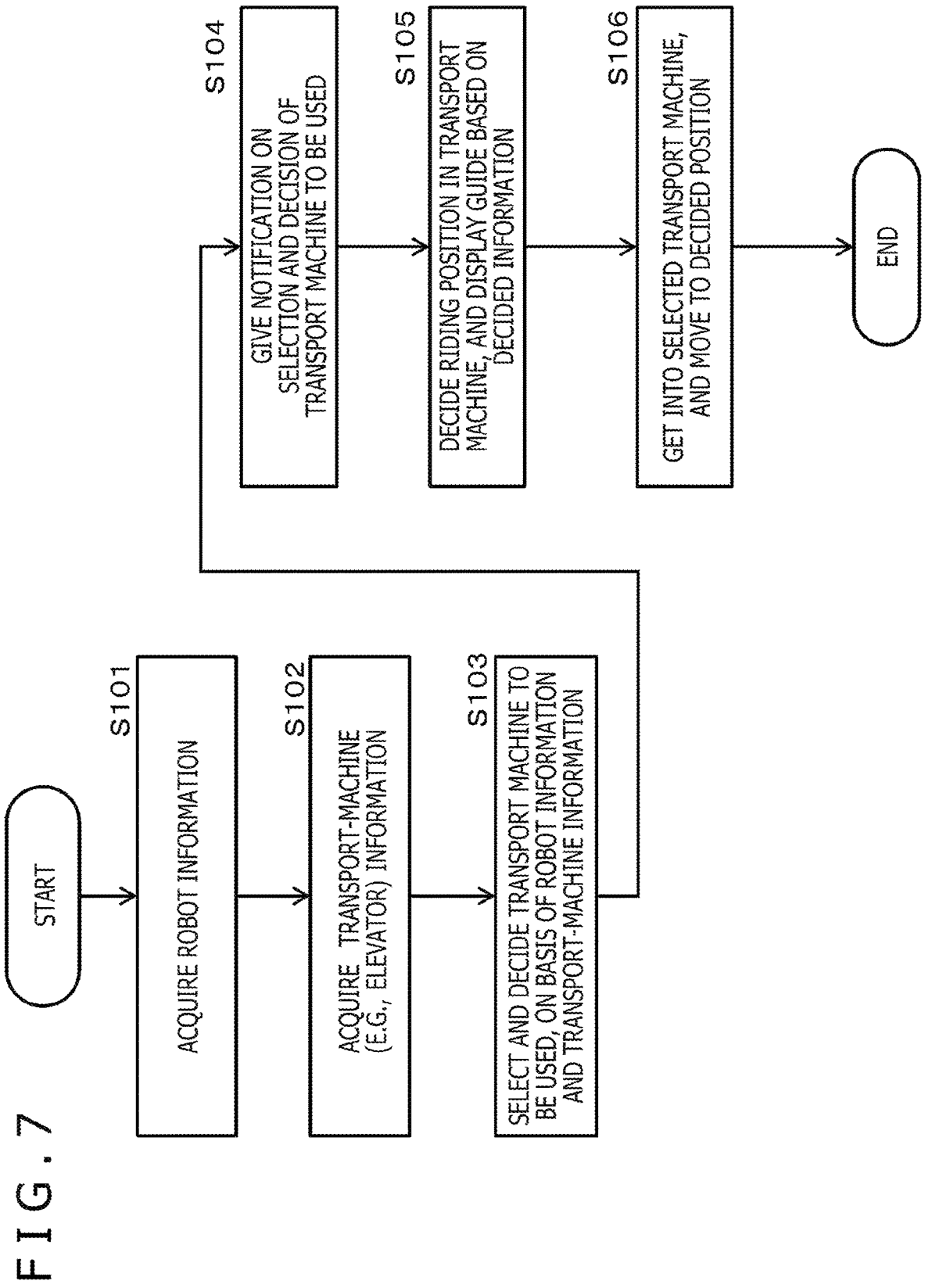

INFORMATION PROCESSING DEVICE, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2020/000665 filed on Jan. 10, 2020, which claims priority benefit of Japanese Patent Application No. JP 2019-027830 filed in the Japan Patent Office on Feb. 19, 2019. Each of the above-referenced applications is hereby incorporated herein by reference in its entirety.

TECHNICAL FIELD

The present disclosure relates to an information processing device, an information processing system, an information processing method, and a program. More specifically, the present disclosure relates to an information processing device, an information processing system, an information processing method, and a program for permitting an automatic traveling robot to safely travel by a transport machine such as an elevator without obstructing any other occupants.

BACKGROUND ART

In recent years, a delivery system using an automatic traveling robot, etc. is being developed.

For example, PTL 1 (Japanese Patent Laid-Open No. 2004-126800) discloses a robot for delivering valuable articles.

For example, in a case where delivery using an automatic traveling robot is made in an apartment, an office, or the like, it is expected that an elevator is used. In a case where there are no elevators for robots only, an elevator that residents of the apartment or workers of the office use is used.

However, a weight of a robot that is carrying a load is heavy. If the robot gets into an elevator, general users cannot get into the elevator in some cases.

CITATION LIST

Patent Literature

[PTL 1]
Japanese Patent Laid-Open No. 2004-126800

SUMMARY

Technical Problem

The present disclosure has been made in view of the above-described problem, for example, and an object thereof is to provide an information processing device, an information processing system, an information processing method, and a program for, in a configuration in which an automatic traveling robot uses a transport machine, such as an elevator, that general users also use, permitting the automatic traveling robot to smoothly travel without excessively obstructing any other general users' usage.

An object of one embodiment of the present disclosure is to provide an information processing device, an information processing system, an information processing method, and a program for, in a configuration in which an automatic traveling robot uses a transport machine, such as an elevator, that general users also use, performing travel control while taking a state, such as the weight, of the robot into consideration, thereby permitting the automatic traveling robot to smoothly travel without excessively obstructing any general users' usage.

Solution to Problem

A first aspect of the present disclosure is an information processing device including a data processing section that selects a transport machine to be taken by a robot. The data processing section acquires robot information that is about the robot and transport-machine information that is about the transport machine, calculates scores corresponding to a plurality of available transport machines on the basis of the acquired information, and selects a transport machine to be used on the basis of the calculated scores.

Furthermore, a second aspect of the present disclosure is an information processing system including a robot, a robot management server, and a building management server. The robot acquires robot information that is about the robot, and transmits the robot information to the robot management server. The building management server acquires transport-machine information that is about the transport machine, and transmits the transport-machine information to the robot management server. The robot management server calculates scores corresponding to a plurality of transport machines available to the robot on the basis of the robot information and the transport-machine information, and selects a transport machine to be used on the basis of the calculated scores.

Furthermore, a third aspect of the present disclosure is an information processing method that is executed by an information processing device including a data processing section that selects a transport machine to be taken by a robot. The method includes causing the data processing section to acquire robot information that is about the robot and transport-machine information that is about the transport machine, and causing the data processing section to calculate scores corresponding to a plurality of available transport machines on the basis of the acquired information, and select a transport machine to be used on the basis of the calculated scores.

Furthermore, a fourth aspect of the present disclosure is an information processing method that is executed by an information processing system including a robot, a robot management server, and a building management server. The method includes causing the robot to acquire robot information that is about the robot and transmit the robot information to the robot management server, causing the building management server to acquire transport-machine information that is about the transport machine, and transmit the transport-machine information to the robot management server, and causing the robot management server to calculate scores corresponding to a plurality of transport machines available to the robot on the basis of the robot information and the transport-machine information and decide a transport machine to be used on the basis of the calculated scores.

Furthermore, a fifth aspect of the present disclosure is a program for causing an information processing device to execute information processing, the information processing device including a data processing section that selects a transport machine to be taken by a robot. The program causes the data processing section to execute a process of acquiring robot information that is about the robot and transport-machine information that is about the transport machine, and a process of calculating scores corresponding to a plurality of available transport machines on the basis of the acquired information and selecting a transport machine to be used on the basis of the calculated scores.

It is to be noted that the program according to the present disclosure can be provided by a recording medium or a communication medium for providing the program in a computer readable format to an information processing device or a computer system that is capable of executing various program codes, for example. Since the program is provided in a computer readable format, processes according to the program are executed in the information processing device or the computer system.

Other objects, features, and advantages of the present disclosure will become apparent from the detailed description based on the embodiment of the present disclosure and the attached drawings which are described later. It is to be noted that, in the present specification, a system refers to a logical set structure including a plurality of devices, and the devices included in the structure are not necessarily included in the same casing.

Advantageous Effects of Invention

With the configuration according to one embodiment of the present disclosure, a configuration for deciding a transport machine to be taken by a robot while taking the efficiency and the cooperativeness into consideration can be implemented.

Specifically, for example, a data processing section that selects a transport machine to be taken by a robot is included. The data processing section acquires robot information that is about the robot and transport-machine information that is about the transport machine, calculates scores corresponding to a plurality of available transport machines on the basis of the acquired information, and selects a transport machine to be used on the basis of the calculated scores. In a case where two or more transport machines satisfy physical conditions for permitting the robot to take the transport machines, the data processing section calculates an efficiency calculation value and a cooperativeness calculation value based on the robot information and the transport-machine information, and calculates scores on the basis of a function using the calculated efficiency calculation value and the calculated cooperativeness calculation value.

With the present configuration, a configuration for deciding a transport machine to be taken by a robot, by taking the efficiency and the cooperativeness into consideration, can be implemented.

It is to be noted that the effects described herein are just examples, and thus, are not limitative. Any other additional effect may be provided.

BRIEF DESCRIPTION OF DRAWINGS

FIG. 1 is a diagram for explaining one example of a process which is executed by an automatic traveling robot according to the present disclosure.

FIGS. 3A and 3B are diagrams for explaining a configuration example of the automatic traveling robot according to the present disclosure.

FIG. 4 is a diagram for explaining a configuration example of an information processing system including the automatic traveling robot according to the present disclosure.

FIG. 5 is a diagram for explaining one example of data stored in a robot information database.

FIG. 6 is a diagram for explaining one example of data stored in a transport-machine information database.

FIG. 7 is a diagram illustrating a flowchart for explaining a process sequence which is executed by the automatic traveling robot according to the present disclosure.

DESCRIPTION OF EMBODIMENT

Figure 2:
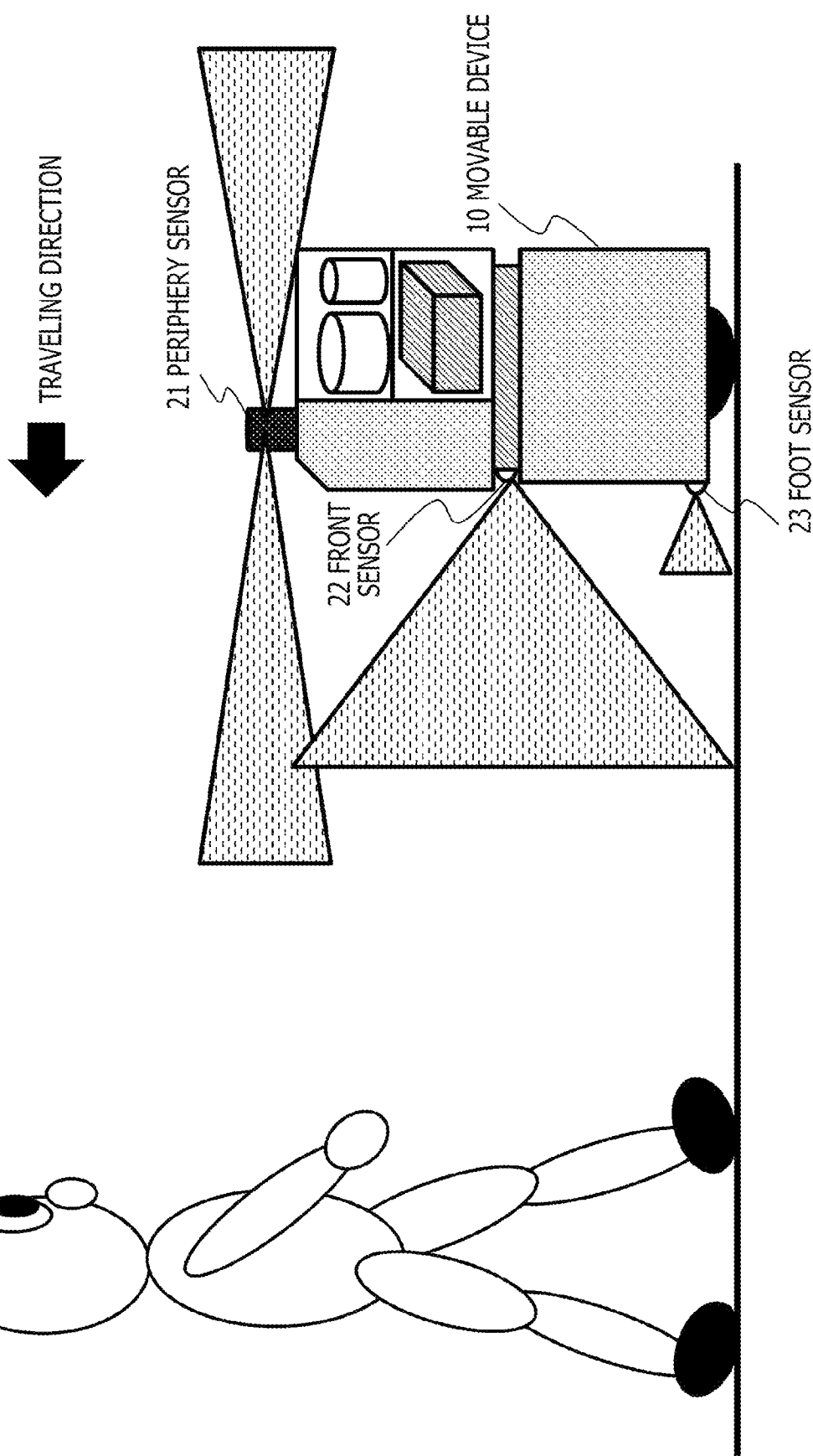
FIG. 2 is a diagram for explaining a configuration example of the automatic traveling robot according to the present disclosure.

Hereinafter, an information processing device, an information processing system, an information processing method, and a program according to the present disclosure will be explained in detail with reference to the drawings. It is to be noted that the explanation will be given in accordance with the following items.

1. Outline of Processing That Is Executed by Information Processing Device According to Present Disclosure
2. Configuration Example of External Appearance of Automatic Traveling Robot
3. One Configuration Example of Information Processing System According to Present Disclosure
4. Process Sequence That Is Executed by Automatic Traveling Robot
5. Internal Configuration Example of Automatic Traveling Robot
6. Hardware Configuration Example of Each Device
7. Conclusion of Configuration According to Present Disclosure

[1. Outline of Processing that is Executed by Information Processing Device According to Present Disclosure]

First, an outline of processing that is executed by an information processing device according to the present disclosure will be explained with reference to FIG. 1.

An information processing device according to the present disclosure is an automatic traveling robot 10 illustrated in FIG. 1.

FIG. 1 illustrates a situation of an area in front of elevators in an entrance of an apartment.

The automatic traveling robot 10 uses the elevators to make delivery to a resident of an upper floor of the apartment.

The apartment is equipped with two elevators. Both of the elevators can be used by residents, for example, users a to c 20a to 20c illustrated in FIG. 1, for example. No elevators are installed for robots only.

In such a case, the automatic traveling robot 10 uses these elevators in company with the users 20 who are residents.

However, a weight of a robot that is carrying a load is heavy. If the robot gets into an elevator, general users cannot get into the elevator in some cases.

In such a configuration in which the automatic traveling robot illustrated in FIG. 1 which is the information processing device according to the present disclosure uses a transport machine, such as an elevator, that general users also use, travel control is performed while a state, such as the weight, of the robot is taken into consideration, for example. Accordingly, the automatic traveling robot can smoothly travel without excessively obstructing any other users' usage.

It is to be noted that the following embodiment exemplifies a case where a robot that makes delivery is used as one example of the automatic traveling robot 10. However, a robot according to the present disclosure is not limited to delivery robots and is applicable to various traveling robots including a robot that performs any other processes including a monitoring process, for example.

In addition, an explanation using an elevator as an example of a transport machine that the robot uses will be given. However, the transport machine is not limited to elevators. The configuration according to the present disclosure can be used in a case where various transport machines such as automobiles, trains, and escalators are used.

[2. Configuration Example of External Appearance of Automatic Traveling Robot]

Next, one example of an external appearance of the automatic traveling robot 10 will be explained.

The automatic traveling robot 10 is equipped with a plurality of sensors in order to achieve safe travel in a place such as an apartment or an office where there are many people and obstacles.

FIG. 2 is a diagram illustrating a situation in which the automatic traveling robot 10 is coming close to a user (person) 20.

In such a situation, if the automatic traveling robot 10 keeps traveling, the automatic traveling robot 10 will collide with the user (person) 20.

In order to avoid such a collision or contact, the automatic traveling robot 10 is equipped with a plurality of sensors.

The plurality of sensors mounted on the automatic traveling robot 10 will be explained with reference to FIG. 2.

As illustrated in FIG. 2, the following three types of sensors:

(a) a periphery sensor 21;
(b) a front sensor 22; and
(c) a foot sensor 23 are mounted on the automatic traveling robot 10.

The (a) periphery sensor 21 detects a peripheral status of the automatic traveling robot 10, and is mounted on an upper portion of the automatic traveling robot 10.

The automatic traveling robot 10 has a columnar shape having a height of approximately 1 m, for example. A sensing region of the periphery sensor 21 is set at a height corresponding to a position of an upper surface of the robot.

The sensing region of the periphery sensor 21 is set to a region having a radius of approximately 20 m and an expansion angle of approximately 30° from the sensor, for example. The periphery sensor 21 detects presence/absence of an obstacle in this region, and detects a distance to the obstacle or the like.

It is to be noted that information detected by the periphery sensor 21 is inputted to a control section (data processing section) of the automatic traveling robot 10, is used to detect an obstacle in the periphery, and is also used for a process of estimating a self-position of the automatic traveling robot 10.

The automatic traveling robot 10 needs to move along a prescribed route or a route that is designated by a user call. For this movement, a process of estimating the self-position is necessary.

The information detected by the periphery sensor 21 is used for this self-position estimating process.

Specifically, the periphery sensor 21 includes either a LiDAR (Light Detection and Ranging, Laser Imaging Detection and Ranging) that acquires periphery information by using a pulsed laser beam, or a fish eye camera or an all-around camera capable of photographing an entire periphery, or a combination thereof, for example.

The (b) front sensor 22 detects a status in a front side which is a traveling direction of the automatic traveling robot 10, and is mounted on a position on a middle stage of the front side of the automatic traveling robot 10.

A sensing region of the front sensor 22 is set at a height roughly corresponding to a center portion of the robot.

The sensing region of the front sensor 22 is set to a region having an expansion angle of approximately 60° from the sensor and being extended forward by approximately 2 m. The front sensor 22 detects presence/absence of an obstacle in this region, and detects a distance to the obstacle, and the like.

It is to be noted that information detected by the front sensor 22 is inputted to the control section (data processing section) of the automatic traveling robot 10, and is used to detect an obstacle in the front side.

Specifically, the front sensor 22 includes a ToF (Time of Flight) sensor or a camera, or a combination thereof, for example.

Like the front sensor 22, the (c) foot sensor 23 also detects the status in the front side which is the traveling direction of the automatic traveling robot 10, but mainly detects an obstacle at a foot position forward of the automatic traveling robot 10.

The foot sensor 23 is mounted at a position so as to be able to detect an obstacle in a region in a dead angle of the front sensor 22.

Specifically, the foot sensor 23 is mounted at a position on a lower portion of the automatic traveling robot 10.

A sensing region of the foot sensor 23 is set to a region having an expansion angle of approximately 30° from the sensor and being extended forward by approximately 50 cm. The foot sensor 23 detects presence/absence of an obstacle in this region, and detects a distance to the obstacle, and the like.

For example, a shoe worn by the person can be detected.

It is to be noted that information detected by the foot sensor 23 is inputted to the control section (data processing section) of the automatic traveling robot 10, and is used to detect an obstacle in a front side underfoot.

Specifically, the foot sensor 23 includes any one of a LiDAR, a distance sensor, a bumper sensor, a camera, and the like, or a combination thereof, for example.

It is to be noted that, in the example illustrated in FIG. 2, the automatic traveling robot 10 includes the three sensors:

the (a) periphery sensor 21 on the upper portion of the automatic traveling robot 10;
the (b) front sensor 22 in the middle-stage position of the automatic traveling robot 10; and
the (c) foot sensor 23 on the lower portion of the automatic traveling robot 10.

However, when a detection range of the front sensor 22, for example, is widened, the foot sensor can be omitted. Conversely, when a detection range of the foot sensor 23 is widened, the front sensor 22 can be omitted.

Further, if an all-around sensor capable of confirming the peripheral status, which is not restricted to the front status, is mounted on the middle stage of the automatic traveling robot 10 such that the all-around sensor has even the function of the periphery sensor 21, the periphery sensor 21 in the upper portion of the automatic traveling robot 10 can be omitted.

The automatic traveling robot 10 inputs the sensor detection information to the control section (data processing section) of the automatic traveling robot 10, so that the control section detects an obstacle, for example.

For example, in a case where the automatic traveling robot 10 has come so close that the distance to the obstacle is equal to or shorter than a prescribed one, or has erroneously come into contact with the obstacle, the control section stops the automatic traveling robot 10.

In addition, the control section (data processing section) determines whether or not the object is a person in the automatic traveling robot 10 on the basis of information detected by a sensor including a camera or the like. In a case where the object is a person, a process of determining whether or not the person is facing forward with the face of the person directed toward the automatic traveling robot 10, is also executed. These processes are executed through collation with pattern data regarding persons or faces stored in a storage section of the automatic traveling robot 10, for example.

In the case of performing a process of determining whether or not an approaching object is a person, and determining, if the object is a person, whether or not the person is facing forward, the control section of the automatic traveling robot 10 uses discrimination learning data stored in the storage section, for example.

Next, components of the automatic traveling robot 10 excluding the sensors will be explained with reference to FIGS. 3A and 3B.

As previously described, the automatic traveling robot 10 is capable of safely traveling in a place, such as an apartment or an office, where there are many people and other obstacles. The example illustrated in FIGS. 3A and 3B exemplifies a robot that makes delivery, and an article to be delivered to a user is housed in the robot.

FIGS. 3A and 3B illustrates (FIG. 3A) a front surface (traveling direction side) of the automatic traveling robot 10, and (FIG. 3B) a rear surface (openable/closable door is in a closed state) of the automatic traveling robot 10.

As illustrated in the FIG. 3A front surface (traveling direction side) in FIGS. 3A and 3B, the automatic traveling robot 10 includes an upper unit 30, a lower unit 40, and wheels 50.

As illustrated in the FIG. 3B rear surface (openable/closable door is in a closed state) in FIGS. 3A and 3B, a delivery-article housing section 36 in which a delivery article is housed is mounted in the upper unit 30.

The delivery-article housing section 36 is formed so as to be attachable to/detachable from the upper unit 30.

A control section that controls the automatic traveling robot 10, a driving section, a battery, a transformer (DCDC converter), etc. are stored in the lower unit 40.

Two wheels 50 are mounted on left and right portions of a bottom surface of the automatic traveling robot. In a case where the automatic traveling robot 10 travels forward or rearward, the two wheels rotate to the same direction.

In addition, in a case where the automatic traveling robot 10 rotates (turns) at a prescribed position, the two wheels rotate in opposite directions. As a result of this process, the automatic traveling robot 10 can rotate at a fixed position.

It is to be noted that a plurality of casters is provided on the bottom surface of the automatic traveling robot in order to prevent a turnover of the robot and to cause the robot to freely rotate.

As illustrated in the figure, blinkers 31, a display section 32, a microphone 33, a stop button 34, and loudspeakers 35 are provided on the upper unit 30.

Under control of the control section of the automatic traveling robot 10, each of the blinkers 31 is lit in a case where the automatic traveling robot turns right or left.

The display section 32 includes a liquid crystal display or the like, for example, and displays guide information, etc. to users in a peripheral area.

The microphone 33 serves as a voice input section. Voice information, such as information about an instruction from a user, inputted through the microphone is inputted to the control section of the automatic traveling robot 10. The control section performs a voice analysis process on the information, so that control based on an analysis result is performed.

The stop button 34 can be operated by a user. Upon being depressed by the user, the stop button 34 can cause the automatic traveling robot 10 to stop traveling.

For example, in a case where there is danger in traveling, the automatic traveling robot 10 can be stopped by a user operation.

The loudspeakers 35 are used to output notification information, alarm sounds, etc.

[3. Configuration Example of Information Processing System According to Present Disclosure]

Next, a configuration example of an information processing system according to the present disclosure will be explained.

FIG. 4 is a diagram illustrating one configuration example of the information processing system according to the present disclosure.

A plurality of automatic traveling robots 10a, 10b, . . . , a robot management server 70, and a building management server 80 are communicable with each other over a network.

The robot management server 70 performs travel management of the plurality of automatic traveling robots 10a, 10b, . . . by communicating with the automatic traveling robots 10a, 10b, . . . and the building management server 80.

The building management server 80 manages a building such as an apartment or an office in which the automatic traveling robots 10a, 10b, . . . , travel. For example, the building management server 80 manages an operation status of elevators. Furthermore, the building management server 80 acquires information about a congestion status, a traveling status of each robot, an external appearance (dirt) of each robot, etc. by receiving as inputs information acquired by sensors such as cameras installed in the building or the elevators, and provides the acquired information to the robot management server 70.

Each of the automatic traveling robots 10a, 10b, . . . , also sequentially transmits information acquired by a sensor such as a camera to the robot management server 70.

The robot management server 70 stores the information received from the automatic traveling robots 10a, 10b, . . . and the building management server 80 into a database.

In a robot information DB 71 illustrated in the figure, data regarding a robot status, etc. is stored for each robot, and is sequentially updated.

Also, in a transport-machine information DB 72, information about a transport machine such as an elevator is stored for each transport machine, and is sequentially updated.

FIG. 5 illustrates an example of data stored in the robot information DB 71. Further, FIG. 6 illustrates an example of data stored in the transport-machine information DB 72.

First, an example of data stored in the robot information DB 71 will be explained with reference to FIG. 5.

For example, the robot information DB 71 stores data as follows:

(1) movement information;
(2) weight information;
(3) occupation region information;
(4) external appearance information; and
(5) route information.

For example, at least any one of (1) to (5) is stored in the robot information DB 71.

It is to be noted that the robot information is recorded for each automatic traveling robot 10.

In the robot information DB 71, the data of (1) to (5) described above is recorded in association with a corresponding robot identifier (robot ID).

As the (1) movement information, information about a movement direction of an automatic traveling robot 10, a floor at which stop is made, a destination position, etc. is recorded. For example, when a delivery is decided, this information is recorded on the basis of the delivery information.

As the (2) weight information, the own weight of the automatic traveling robot 10, and weights of respective loads, etc. are recorded.

As the (3) occupation region information, an occupation region of the automatic traveling robot 10 having a load mounted thereon, or for example, a length in each direction in three-dimensions (x, y, z), is recorded.

As the (4) external appearance information, the external appearance of the automatic traveling robot 10, or information about presence/absence of dirt, presence/absence of a protruding object, etc. is recorded.

As the (5) route information, information about a destination of the automatic traveling robot 10, a floor that the automatic traveling robot 10 uses, a scheduled required time, etc. is recorded.

It is to be noted that the robot management server 70 generates the information (1) to (5) on the basis of the information acquired by the automatic traveling robots 10a, 10b, . . . and the building management server 80, and sequentially updates the information.

The automatic traveling robots 10a, 10b, . . . and the building management server 80 transmit information from sensors mounted on the robots or a building, etc. to the robot management server 70. The robot management server 70 generates and updates the robot information illustrated in FIG. 5 on the basis of the received information.

It is to be noted that the information stored in the robot information DB 71 not only can be used by the robot management server 70, but also can be acquired and used by the automatic traveling robots 10a, 10b, . . . and the building management server 80.

Next, an example of data stored in the transport-machine information DB 72 will be explained with reference to FIG. 6.

For example, the transport-machine information DB 72 stores data as follows:

(1) movement information;
(2) weight information;
(3) occupation region information; and
(4) occupant information.

For example, at least any one of (1) to (4) is stored in the transport-machine information DB 72.

It is to be noted that (1) to (4) are recorded for each transport machine such as an elevator.

In the transport-machine information DB 72, the data of (1) to (4) described above is recorded in association with a corresponding transport machine identifier (transport machine ID).

As the (1) movement information, information about a movement direction of a transport machine such as an elevator, a floor at which stop is made, etc. is recorded. The building management server 80 acquires this information from an elevator management device.

As the (2) weight information, weights of an occupant and a baggage, etc. in the transport machine such as an elevator are recorded.

As the (3) occupation region information, information about an occupied space in the transport machine such as an elevator is recorded. Specifically, the (3) occupation region information is about a space occupied by a user using the elevator. On the basis of this data, whether or not a space for the automatic traveling robot 10 is left can be determined.

As the (4) occupant information, information about a person in the transport machine such as an elevator is recorded. For example, presence/absence of a child or a wheelchaired person is recorded. This information is used to prevent the automatic traveling robot 10 from getting into the transport machine as much as possible in a case where a child or a wheelchaired person is present in the transport machine.

It is to be noted that the robot management server 70 generates the information (1) to (4) on the basis of the information acquired by the automatic traveling robots 10a, 10b, . . . and the building management server 80, and sequentially updates the information.

The automatic traveling robots 10a, 10b, . . . and the building management server 80 transmit information from sensors, etc. mounted on the robots and the building, to the robot management server 70. The robot management server 70 generates and updates the transport-machine information illustrated in FIG. 6 on the basis of the received information.

It is to be noted that also the information stored in the transport-machine information DB 72 not only can be used by the robot management server 70, but also can be acquired and used by the automatic traveling robots 10a, 10b, . . . and the building management server 80.

[4. Process Sequence that is Executed by Automatic Traveling Robot]

Next, a process sequence that is executed by an automatic traveling robot as an information processing device according to the present disclosure will be explained.

A flowchart illustrated in FIG. 7 is provided to explain one example of a process sequence that is executed by the automatic traveling robot 10.

Processes according to the flowchart illustrated in FIG. 7 can be executed by the control section (data processing section) of the automatic traveling robot 10, in accordance with a program stored in the storage section of the automatic traveling robot 10, for example. The processes can be executed as program execution processes by a processor such as a CPU having a program executing function, for example.

It is to be noted that some of steps in the flow illustrated in FIG. 7 can be executed as processes at the robot management server 70 or the building management server 80 which can communicate with the automatic traveling robot 10.

Steps of the flow illustrated in FIG. 7 will be explained below.

(Step S101)

First, at step S101, the automatic traveling robot 10 executes a process of acquiring robot information.

This process is the process of acquiring data stored in the robot information DB, which has been explained with reference to FIG. 5, for example.

As previously explained with reference to FIG. 5, the robot information DB 71 stores, for example, the data as follows:

(1) movement information;
(2) weight information;
(3) occupation region information;
(4) external appearance information; and
(5) route information.

It is to be noted that, for each automatic traveling robot 10, (1) to (5) are independently recorded in association with the corresponding robot ID.

The automatic traveling robot 10 acquires robot information corresponding to the robot ID of the automatic traveling robot 10 itself from the robot information DB 71.

The data in the robot information DB 71 can be acquired from the robot management database 71 held in the robot management server 70. It is to be noted that the storage section of the automatic traveling robot 10 may be configured to store data similar to the data in the robot information DB 71 such that the data can be read out from the storage section.

(Step S102)

Next, at step S102, the automatic traveling robot 10 executes a process of acquiring transport-machine information about a transport machine such as an elevator to be used.

This process is a process of acquiring the data stored in the transport-machine information DB, which has been explained with reference to FIG. 6, for example.

As previously explained with reference to FIG. 6, the transport-machine information DB 72 stores, for example, the data as follows:

(1) movement information;
(2) weight information;
(3) occupation region information; and
(4) occupant information.

It is to be noted that, for each transport machine such as an elevator, (1) to (4) are independently recorded in association with the corresponding transport machine ID.

In a case where two or more transport machines such as elevators are available to get to the destination, the automatic traveling robot 10 acquires the transport-machine information about all the available transport machines from the transport-machine information DB 72.

Data in the transport-machine information DB 72 can be acquired from the transport-machine information DB 72 held in the robot management server 70. It is to be noted that the storage section of the automatic traveling robot 10 may be configured to store data similar to the data in the transport-machine information DB 72 such that the data can be read out from the storage section. Alternatively, the data may be acquired from the building management server 80.

(Step S103)

Next, at step S103, the automatic traveling robot 10 selects a transport machine to be used on the basis of the robot information acquired at step S101 and the transport-machine information acquired at step S102.

In a case where two or more transport machines are selectable, the automatic traveling robot 10 selects, at step S103, one of the transport machines as a machine to be used, by executing the following processes (S01 to S02).

(S01) Select, from among selectable transport machines, a transport machine that satisfies physical conditions for permitting the automatic traveling robot 10 to use the transport machine.

(S02) Calculate a score according to the following score calculation expression (Expression 1) for each transport machine satisfying the physical conditions, and select a transport machine for which a high score has been obtained.

$$\text{Score} = a \times (\text{efficiency calculation value}) + b \times (\text{cooperativeness calculation value}) \quad \text{(Expression 1)}$$

In the score calculation expression, a and b each represent a predetermined multiplication coefficient.

It is to be noted that, for example, the physical conditions in (S01) include the following conditions a to c.

(Condition a) A space for the automatic traveling robot 10 is left in the transport machine.

(Condition b) The total weight does not become overweight if the automatic traveling robot 10 gets in the transport machine.

(Condition c) The height of the automatic traveling robot 10 is not higher than a height limit of the transport machine.

At (S01), a transport machine satisfying all the above conditions a to c is first selected.

In a case where only one transport machine satisfies the physical conditions, the transport machine is selected as a machine to be used.

On the other hand, in a case where two or more transport machines satisfy the physical conditions, (S02) is next executed. That is, scores are calculated according to the score calculation expression (Expression 1), and a transport machine for which a high score has been obtained is selected.

$$\text{Score} = a \times (\text{efficiency calculation value}) + b \times (\text{cooperativeness calculation value}) \quad \text{(Expression 1)}$$

The efficiency calculation value and the cooperativeness calculation value in the above score calculation expression will be explained.

The efficiency calculation value is calculated with use of, for example, at least any one of the following parameters (pa1 to pa3):

(pa1) parameter that corresponds to the number of times of making stop;

(pa2) parameter that corresponds to a time to get in and out; and (pa3) parameter that corresponds to a priority level.

(pa1) The number of times of making stop represents the set number of floors where stop is made (before the automatic traveling robot 10 arrives at the destination floor) for the transport machine such as an elevator.

For example, the parameter that corresponds to the number of times of making stop is set to a value ranging from 0 to 10. The value of the parameter is set to be higher (closer to 10) when the number of times of making stop is less.

(pa2) A time to get in and out represents the total time to get in and out estimated from, for example, the set number of people using the floors at which stop is made (before the automatic traveling robot 10 arrives at the destination floor) for the transport machine such as an elevator.

For example, the parameter that corresponds to a time to get in and out is set to a value ranging from 0 to 10. The value of the parameter is set to be higher (closer to 10) when the time to get in and out is shorter.

(pa3) A priority level represents information about the priority level of a user of the transport machine such as an elevator. For example, a higher priority level is given to a wheelchaired person.

For example, the parameter that corresponds to a priority level is set to a value ranging from 0 to 10. The value of the parameter is set to be higher (closer to 10) when the number of high-priority users is greater.

It is to be noted that information that is used to calculate these parameters is acquired from the data stored in the robot information DB 71 and the data stored in the transport-machine information DB 72, which have been explained with reference to FIGS. 5 and 6.

On the basis of the above parameters (pa1 to pa3), the efficiency calculation value is calculated according to (Expression 2) below:

$$\text{Efficiency calculation value} = a1 \times pa1 + a2 \times pa2 + a3 \times pa3 \quad \text{(Expression 2)}$$

In (Expression 2), a1, a2, and a3 each represent a predetermined multiplication coefficient.

On the other hand, the cooperativeness calculation value indicated by the above (score calculation expression (Expression 1)) is calculated with use of, for example, at least any one of the following parameters (pb1 to pb3):

(pb1) parameter that corresponds to a visual burden;
(pb2) parameter that corresponds to a sensitive burden; and
(pb3) parameter that corresponds to an affinity.

The (pb1) parameter that corresponds to a visual burden is calculated on the basis of the appearance of the automatic traveling robot 10 such as how strong the presence of the automatic traveling robot 10 is or the degree of dirt on the automatic traveling robot 10.

For example, the parameter that corresponds to a visual burden is set to a value ranging from 0 to 10. The value of the parameter is set to be higher (closer to 10) when the presence is weaker or the degree of dirt is lower.

The (pb2) parameter that corresponds to a sensitive burden is calculated on the basis of the sensitive burden that the automatic traveling robot 10 puts upon an occupant in the transport machine. Specifically, the parameter is calculated on the basis of familiarity or the like.

For example, a sensitive burden on a user (occupant) who has seen the automatic traveling robot 10 many times is small, a sensitive burden on a user (occupant) who has never seen the automatic traveling robot 10 before is large.

The parameter that corresponds to a sensitive burden is set to a value ranging from 0 to 10. The value of the parameter is set to be higher (closer to 10) when the sensitive burden on an occupant in the transport machine is smaller.

The (pb3) parameter that corresponds to an affinity is calculated on the basis of an affinity or the like that an occupant in the transport machine has for the automatic traveling robot 10.

For example, a user (occupant) who has made trouble with the automatic traveling robot 10 is determined to lack an affinity, and a user (occupant) who has never made trouble is determined to have an affinity.

The parameter that corresponds to an affinity is set to a value ranging from 0 to 10. The value of the parameter is set to be higher (closer to 10) when the affinity of an occupant in the transport machine is greater.

It is to be noted that information that is used to calculate these parameters is acquired from the data stored in the robot information DB 71 and the data stored in the transport-machine information DB 72, which have been explained with reference to FIGS. 5 and 6.

On the basis of the above parameters (pb1 to pb3), the cooperativeness calculation value is calculated according to (Expression 3) below:

$$\text{Cooperativeness calculation value} = b1 \times pb1 + b2 \times pb2 + b3 \times pb3 \quad \text{(Expression 3)}$$

In (Expression 3), b1, b2, and b3 each represent a predetermined multiplication coefficient.

As explained above, the efficiency calculation value and the cooperativeness calculation value are calculated according to the following (Expression 2) and (Expression 3):

$$\text{Efficiency calculation value} = a1 \times pa1 + a2 \times pa2 + a3 \times pa3 \quad \text{(Expression 2); and}$$

$$\text{Cooperativeness calculation value} = b1 \times pb1 + b2 \times pb2 + b3 \times pb3 \quad \text{(Expression 3).}$$

Thereafter, by using these calculation values, the score is calculated according to the following score calculation expression (Expression 1) for each transport machine satisfying the physical conditions, and a transport machine for which a high score has been obtained is selected.

$$\text{Score} = a \times (\text{efficiency calculation value}) + b \times (\text{cooperativeness calculation value}) \quad \text{(Expression 1)}$$

A transport machine (e.g., elevator) for which the highest score is calculated according to the above (Expression 1) is selected as a transport machine to be used.

It is to be noted that a and b in the above score calculation expression (Expression 1) each represent a predetermined coefficient. For example, the coefficients a and b may be changed according to the situation.

For example, the coefficients a and b may be changed according to the following settings:

(1) time-series change;
(2) emergency change; and
(3) change based on the external appearance of the robot The (1) time-series change corresponds to a normal-time process.

When a lot of time is taken to select an elevator, the efficiency is significantly deteriorated. Therefore, in order to avoid significant deterioration of the efficiency, a weight of the multiplication coefficient a that corresponds to the "efficiency calculation value" is increased relatively to the multiplication coefficient b that corresponds to the "cooperativeness calculation value," according to a waiting time.

Figure 8:
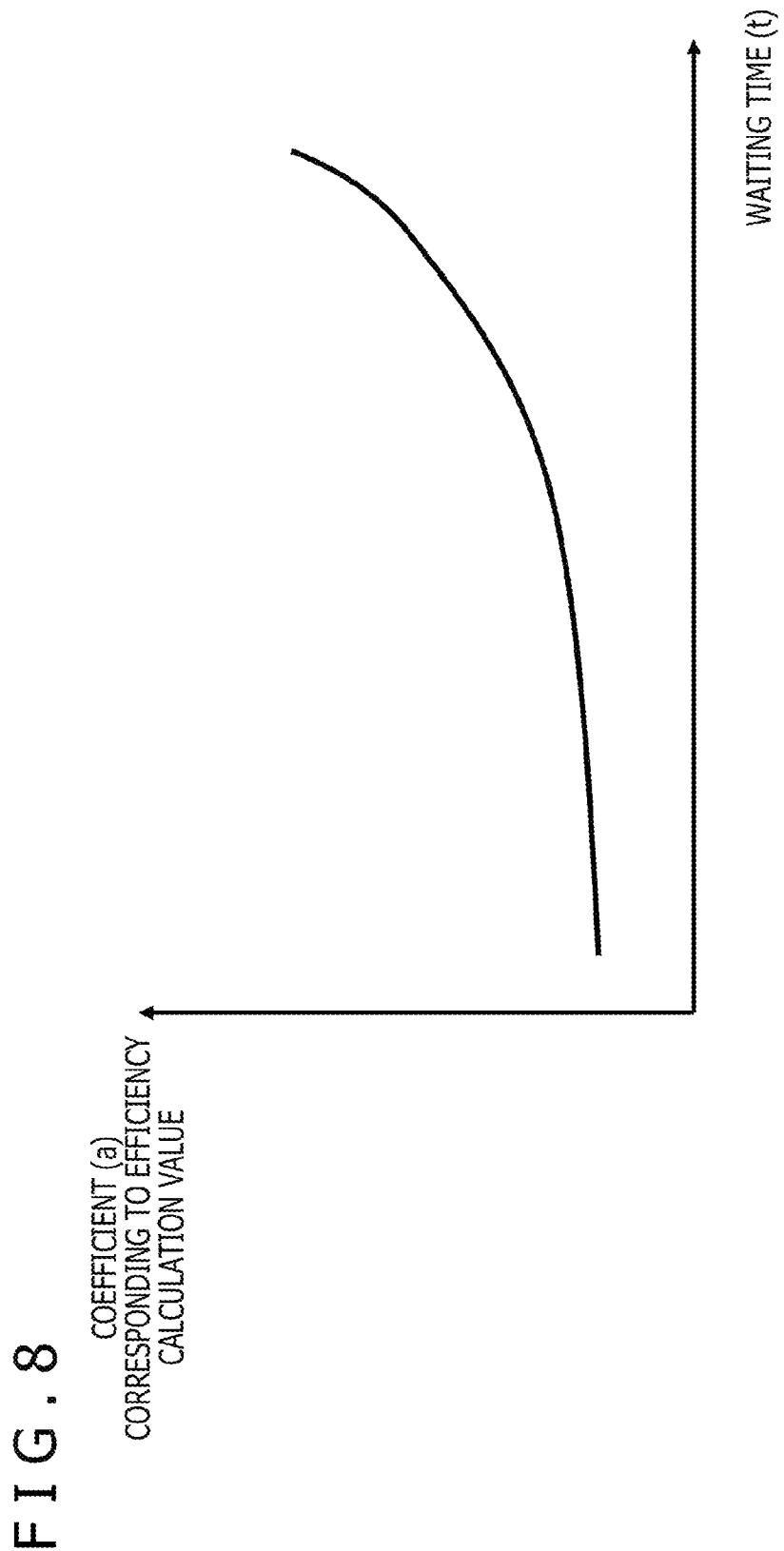
FIG. 8 is a diagram for explaining a specific example of score calculation which is executed during to-be-used transport machine selection which is executed by the automatic traveling robot according to the present disclosure.

This setting is illustrated in FIG. 8.

The (2) emergency change corresponds to a process for a maintenance time of transport machines such as elevators, or the time of a disaster, for example.

For example, during an elevator maintenance time, the efficiency is predicted to be deteriorated more than the normal time because the number of operating elevators is small.

In such a case, the weight of the multiplication coefficient a that corresponds to the "efficiency calculation value" is increased relatively to the multiplication coefficient b that corresponds to the "cooperativeness calculation value."

In addition, when a disaster (earthquake, fire) has occurred, a process of lowering or ignoring the delivery efficiency of the automatic traveling robot is performed because people should be preferentially transported. In this case, the multiplication coefficient b that corresponds to the "cooperativeness calculation value" is increased relatively to the weight of the multiplication coefficient a that corresponds to the "efficiency calculation value."

In the (3) change based on the external appearance of the robot, in a case where, for example, the robot to take the transport machine such as an elevator is larger than a person who takes the transport machine together, the multiplication coefficient b that corresponds to the "cooperativeness calculation value" is increased relatively to the weight of the multiplication coefficient a that corresponds to the "efficiency calculation value."

In this manner, a and b in the score calculation expression (Expression 1) may be changed according to the situation.

That is, the processes that are executed at step S103 of the flow illustrated in FIG. 7 are as follows.

The automatic traveling robot 10 selects, at step S103, a transport machine to be used on the basis of the robot information acquired at step S101 and the transport-machine information acquired at step S102.

In a case where two or more transport machines are selectable, the automatic traveling robot 10 selects, at step S103, one transport machine as a machine to be used by executing (S01) and (S02):

(S01) Select a transport machine that satisfies physical conditions for permitting the automatic traveling robot 10 to use the transport machine, from among the selectable transport machines; and (S02) Calculate, in a case where two or more transport machines satisfy the physical conditions, a score according to the following score calculation expression (Expression 1) for each of the transport machines satisfying the physical conditions, and select a transport machine for which a high score has been obtained.

$$\text{Score} = a \times (\text{efficiency calculation value}) + b \times (\text{cooperativeness calculation value}) \quad \text{(Expression 1)}$$

(Step S104)

After the process of deciding a transport machine such as an elevator to be used by the automatic traveling robot 10 is completed at step S103, the automatic traveling robot 10 next gives notification that the transport machine to be used has been decided, at step S104.

For example, an announcement of the number of an elevator to be used is made through the loudspeakers 35 of the automatic traveling robot 10. Furthermore, to an occupant in the elevator to be used, the announcement is made through an internal loudspeaker of the elevator.

For example, an announcement "a robot will get into this elevator. Thank you for making a space for it" is made.

This announcement is made under the control of the building management server 80 after an announcement request is sent from the automatic traveling robot 10 to the building management server 80, for example.

(Step S105)

Next, at step S105, the automatic traveling robot 10 decides a riding position in the transport machine, and displays, on the display section 32 of the automatic traveling robot 10, guide information based on the decision information.

For example, the process of deciding the riding position in the transport machine is as follows.

For example, a position near the door is selected as the riding position in a case where the robot will get out the transport machine soon, and a position on the back side is set as the riding position in a case where the riding time will be long.

Figure 9:
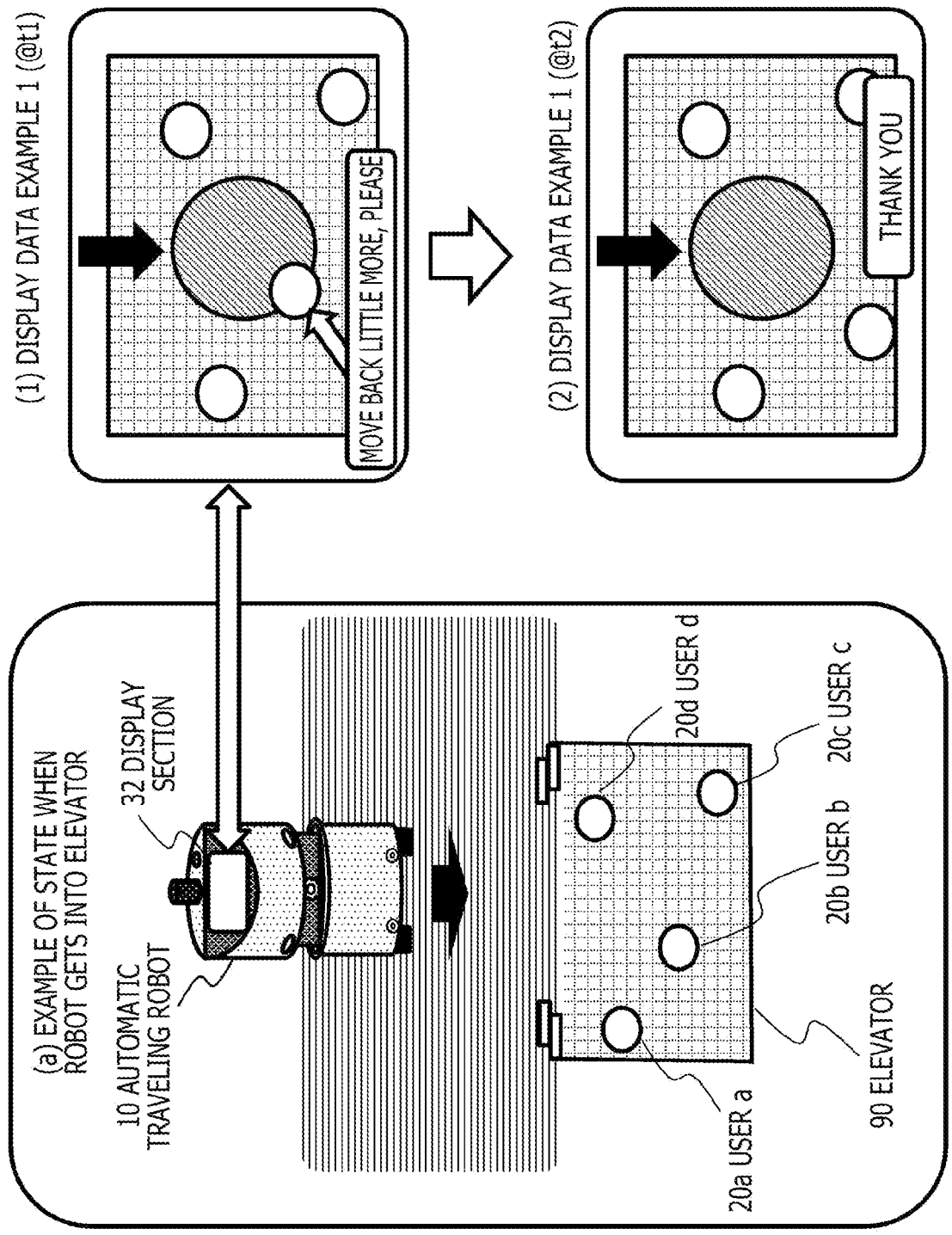
FIG. 9 is a diagram for explaining one example of guide information displayed on a display section of the automatic traveling robot according to the present disclosure.

FIG. 9 is a diagram for explaining an example of displaying guide information based on decision of a riding position.

FIG. 9(a) illustrates a state in which the automatic traveling robot 10 is standing in front of an elevator to be taken by the robot.

In this state, display data illustrated in a display data example 1 (@t1) in FIG. 9(1) is displayed on the display section 32 of the automatic traveling robot 10.

The display data example 1 (@t1) in FIG. 9(1) indicates positions of people (users) in the elevator before the automatic traveling robot 10 gets into the elevator, and indicates a scheduled riding position of the robot.

A large hatched circle region disposed at the center represents the scheduled riding position of the robot.

Four small white circles indicate the positions of people (users) in the elevator. These positions of people correspond to positions of users a to d 20a to s0d illustrated in FIG. 9(a).

In the display data example 1 (@t1) in FIG. 9(1), a person is standing at the scheduled riding position of the automatic traveling robot 10. In this state, the automatic traveling robot 10 cannot move to the scheduled riding position.

In this case, the person standing in the scheduled riding position of the automatic traveling robot 10 is designated, and a message:

"Move back little more, please" is displayed, as illustrated in the display data example 1 (@t1) in FIG. 9(1). It is to be noted that an output of the message may be implemented through a voice output in addition to an image output.

As a result of the output of this message, the person standing in the scheduled riding position of the automatic traveling robot 10 moves back in the elevator. The setting illustrated in FIG. 9(2) is achieved.

As a result of this movement, a space is generated in the scheduled riding position of the automatic traveling robot 10, so that the automatic traveling robot 10 can move to the scheduled riding position.

(Step S106)

After the riding position deciding process and the guide display based on the decision information explained with reference to FIG. 9 are completed at step S105, the automatic traveling robot 10 completes, at step S106, moving to the scheduled riding position in the elevator. Accordingly, riding into the elevator is completed.

Thereafter, when the elevator door opens at the destination floor, the automatic traveling robot 10 gets out of the elevator at the floor, and travels toward the destination.

It is to be noted that setting a floor at which an elevator stops and closing/opening the door is executed by communications of necessary information though communication among the automatic traveling robot 10, the robot management server 70, and the building management server 80, for example.

As explained so far, the automatic traveling robot 10 according to the present disclosure executes the processes according to the flow illustrated in FIG. 7.

It is to be noted that one or more steps of the flow illustrated in FIG. 7 may be executed not only by the automatic traveling robot but also by the robot management server 70 or the building management server 80.

For example, the robot information acquiring process, the transport-machine information acquiring process, the process of deciding a transport machine to be used on the basis of the score calculation at steps S101 to S103 etc. may be executed by the robot management server 70. In this case, the robot management server 70 notifies the automatic traveling robot 10 of information about the transport machine decided by the robot management server 70.

[5. Internal Configuration Example of Automatic Traveling Robot]

Next, an explanation will be given of the internal configuration example of the automatic traveling robot 10 which is an information processing device according to the present disclosure.

Figure 10:
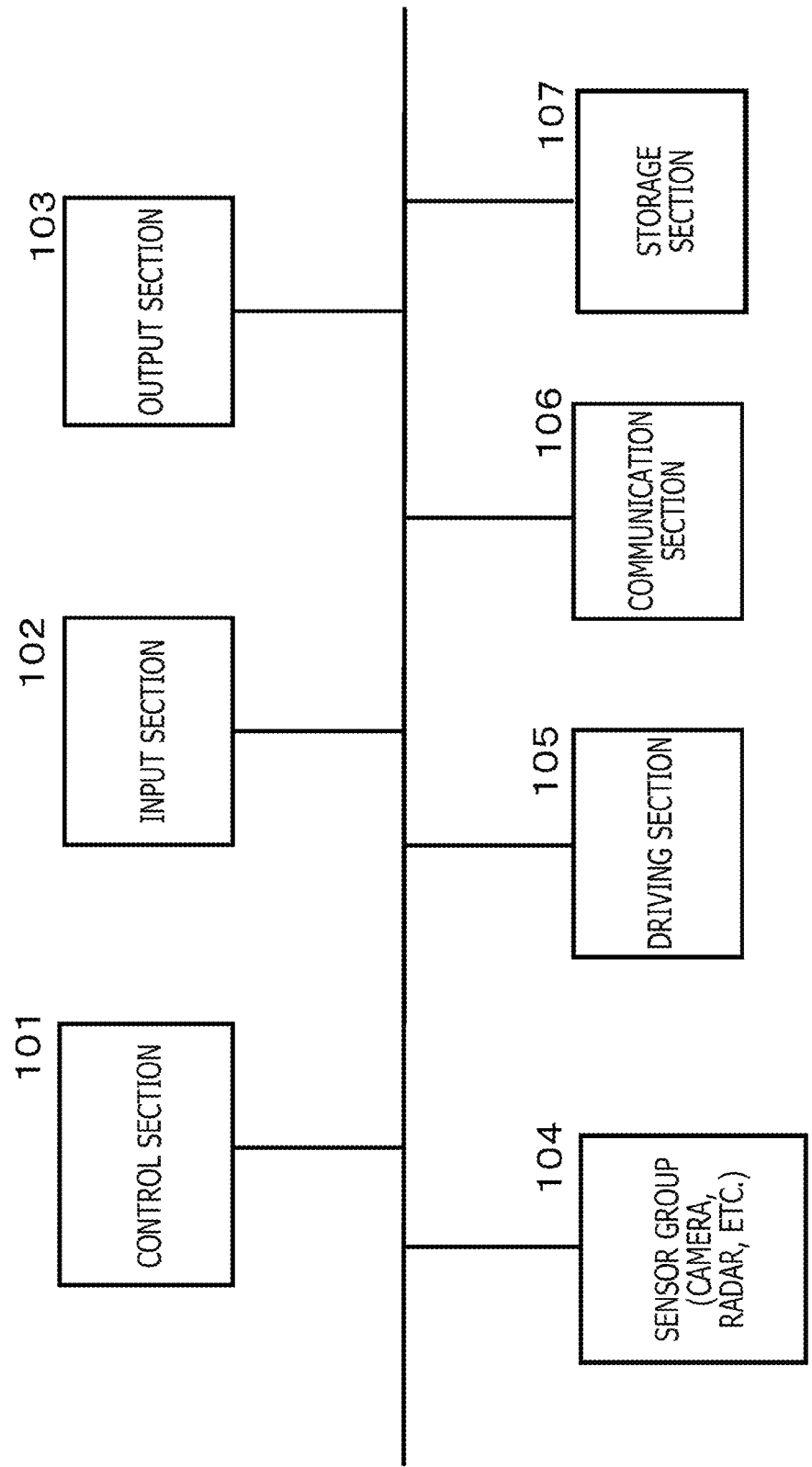
FIG. 10 is a diagram for explaining a configuration example of the automatic traveling robot according to the present disclosure.

FIG. 10 is a block diagram illustrating one configuration example of the automatic traveling robot 10 which is an information processing device according to the present disclosure.

As illustrated in FIG. 10, the automatic traveling robot 10 includes a control section 101, an input section 102, an output section 103, a sensor group 104, a driving section 105, a communication section 106, and a storage section 107.

The control section 101 controls processes that are executed in the automatic traveling robot 10. For example, the control section 101 executes a process in accordance with a control program stored in the storage section 107. The control section 101 includes a processor having a program executing function.

The input section 102 is an interface through which various data can be inputted by a user. The input section 102 includes a touch panel, a code reading section, various switches, or the like.

The output section 103 is a loudspeaker that outputs alerts or sounds, a display that outputs images, or an output section that outputs spotlights or the like.

The sensor group 104 includes various sensors such as a camera, a microphone, a radar, a distance sensor, etc.

The driving section 105 includes, for example, a direction control mechanism or a wheel driving section for causing the automatic traveling robot to travel.

The communication section 106 executes a process of communicating with an external device such as the robot management server or the building management server, for example.

The storage section 107 stores robot information and transport-machine information, for example, in addition to the program that is executed by the control section 101.

[6. Hardware Configuration Example of Each Device]

Next, a hardware configuration example of the automatic traveling robot 10, the robot management server 70, or the building management server 80 will be explained with reference to FIG. 11.

Figure 11:
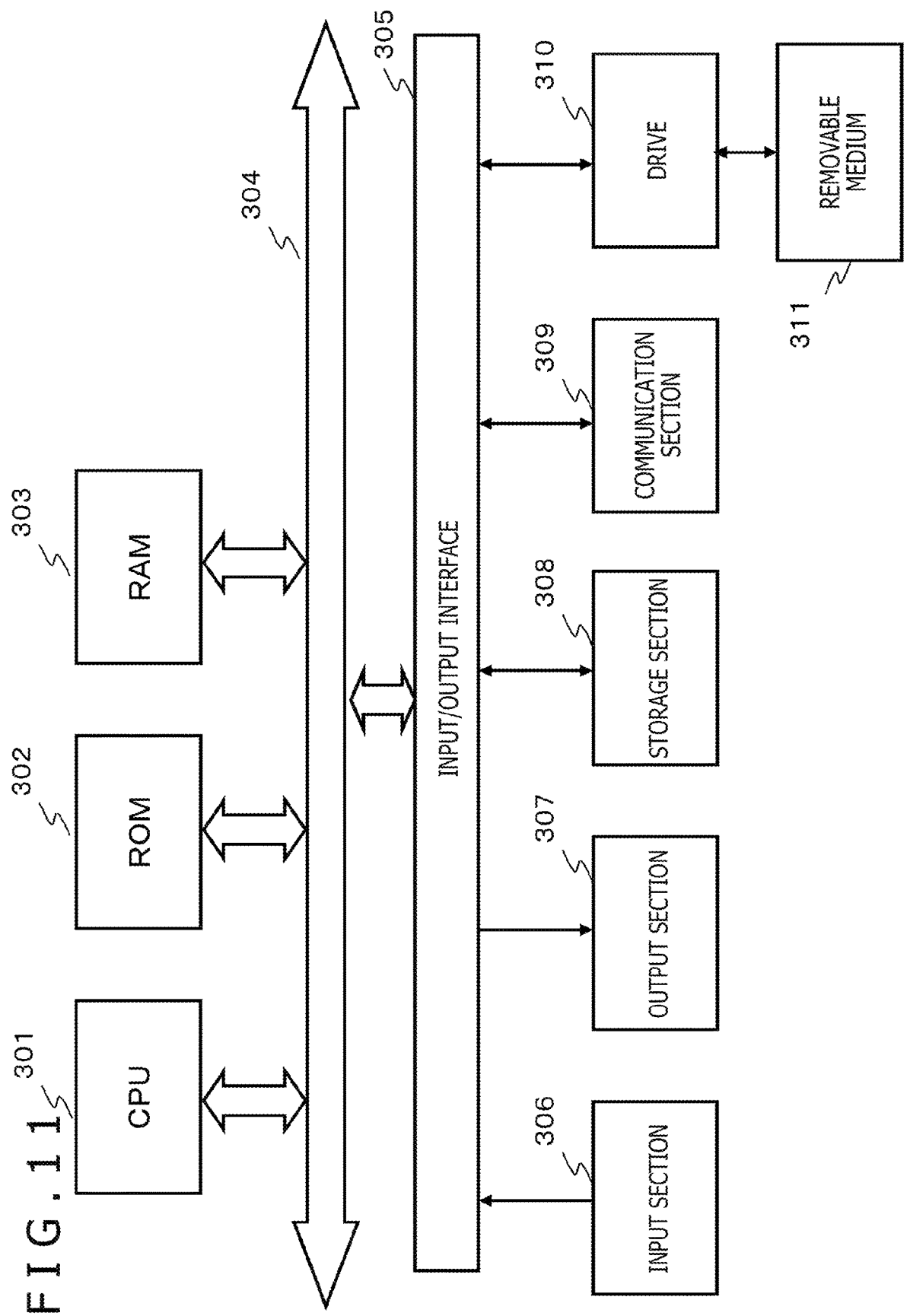
FIG. 11 is a diagram for explaining a hardware configuration example of a server or the automatic traveling robot according to the present disclosure.

The hardware configuration illustrated in FIG. 11 exemplifies one example of a hardware configuration that is applicable to each of these devices.

A CPU (Central Processing Unit) 301 functions as a data processing section to execute various processes in accordance with a program stored in a ROM (Read Only Memory) 302 or a storage section 308. The CPU 301 executes a process according to the sequence having been explained in the above embodiment, for example. Data and a program to be executed by the CPU 301 are stored in a RAM (Random Access Memory) 303. The CPU 301, the ROM 302, and the RAM 303 are mutually connected via a bus 304.

The CPU 301 is connected to an input/output interface 305 via the bus 304. An input section 306 which includes various switches, a keyboard, a touch panel, a mouse, a microphone, or the like, and an output section 307 which includes a display, a loudspeaker, or the like, are connected to the input/output interface 305.

The storage section 308 connected to the input/output interface 305 includes a hard disk, for example, and stores various kinds of data and the program to be executed by the CPU 301. A communication section 309 functions as a transmission/reception section to perform data communication over a network such as the internet or a local area network, and communicates with an external device.

A drive 310 connected to the input/output interface 305 drives a removable medium 311 such as a magnetic disk, an optical disk, a magneto-optical disk, or a semiconductor memory (e.g., memory card), so that data recording/reading is executed.

[7. Conclusion of Configuration According to Present Disclosure]

Embodiments of the present disclosure have been explained in detail with reference to the specific embodiment. However, it is obvious that a person skilled in the art can make modification or substitution on the embodiment within the gist of the present disclosure. That is, the present invention has been disclosed in a form of exemplifications, and thus, should not be limitedly interpreted. In order to assess the gist of the present disclosure, the claims should be considered.

It is to be noted that the technology disclosed herein can have the following configurations.

(1) An information processing device including:
  a data processing section that selects a transport machine to be taken by a robot, in which
  the data processing section
    acquires robot information that is about the robot and transport-machine information that is about the transport machine, and
    calculates scores corresponding to a plurality of available transport machines on the basis of the acquired information, and selects a transport machine to be used on the basis of the calculated scores.

(2) The information processing device according to (1), in which
  the data processing section determines a transport machine that satisfies a physical condition for permitting the robot to take the transport machine,
  in a case where only one transport machine satisfies the physical condition, the data processing section selects the one transport machine as the transport machine to be used, and
  in a case where two or more transport machines satisfy the physical condition, the data processing section calculates scores corresponding to the plurality of available transport machines, and selects the transport machine to be used on the basis of the calculated scores.

(3) The information processing device according to (1) or (2), in which
  the data processing section calculates an efficiency calculation value and a cooperativeness calculation value based on the robot information and the transport-machine information, and calculates the scores on the basis of a function using the calculated efficiency calculation value and the calculated cooperativeness calculation value.

(4) The information processing device according to (3), in which
  the data processing section calculates the scores according to an expression:

$$\text{score} = a \times (\text{efficiency calculation value}) + b \times (\text{cooperativeness calculation value})$$

where a and b each represent a multiplication coefficient.

(5) The information processing device according to (3) or (4), in which
  the data processing section calculates the efficiency calculation value by using at least either the number of times by which the transport machine makes stop or a time to get in and out the transport machine.

(6) The information processing device according to any one of (3) to (5), in which
 the data processing section calculates the cooperativeness calculation value by using at least any one of a visual burden on a user using the transport machine, a sensitive burden on the user, or an affinity that the user has.

(7) The information processing device according to any one of (1) to (6), in which
 the robot information includes at least any one of movement information, weight information, occupation region information, external appearance information, or route information regarding the robot.

(8) The information processing device according to any one of (1) to (7), in which
 the transport-machine information includes at least any one of movement information, weight information, occupation region information, or occupant information regarding the transport machine.

(9) The information processing device according to any one of (1) to (8), in which,
 after deciding the transport machine to be used, the data processing section executes a decision-information notifying process.

(10) The information processing device according to any one of (1) to (9), in which,
 after deciding the transport machine to be used, the data processing section further decides a riding position of the robot in the transport machine, and executes a decided-riding-position notifying process.

(11) The information processing device according to (10), in which
 the data processing section displays, on a display section of the robot, data indicating the riding position of the robot in the transport machine.

(12) The information processing device according to any one of (1) to (11), further including:
 a driving section for self-traveling.

(13) An information processing system including:
 a robot;
 a robot management server; and
 a building management server, in which
 the robot acquires robot information that is about the robot, and transmits the robot information to the robot management server,
 the building management server acquires transport-machine information that is about the transport machine, and transmits the transport-machine information to the robot management server, and
 the robot management server calculates scores corresponding to a plurality of transport machines available to the robot on the basis of the robot information and the transport-machine information, and selects a transport machine to be used on the basis of the calculated scores.

(14) The information processing system according to (13), in which
 the robot management server determines a transport machine that satisfies a physical condition for permitting the robot to take the transport machine,
 in a case where only one transport machine satisfies the physical condition, the robot management server selects the one transport machine as the transport machine to be used, and
 in a case where two or more transport machines satisfy the physical condition, the robot management server calculates scores corresponding to the plurality of available transport machines, and selects the transport machine to be used on the basis of the calculated scores.

(15) The information processing system according to (13) or (14), in which
 the robot management server calculates an efficiency calculation value and a cooperativeness calculation value based on the robot information and the transport-machine information, and calculates the scores on the basis of a function using the calculated efficiency calculation value and the calculated cooperativeness calculation value.

(16) An information processing method that is executed by an information processing device including a data processing section that selects a transport machine to be taken by a robot, the method including:
 causing the data processing section to acquire robot information that is about the robot and transport-machine information that is about the transport machine; and
 causing the data processing section to calculate scores corresponding to a plurality of available transport machines on the basis of the acquired information, and select a transport machine to be used on the basis of the calculated scores.

(17) An information processing method that is executed by an information processing system including a robot, a robot management server, and a building management server, the method including:
 causing the robot to acquire robot information that is about the robot, and transmit the robot information to the robot management server;
 causing the building management server to acquire transport-machine information that is about the transport machine, and transmit the transport-machine information to the robot management server; and
 causing the robot management server to calculate scores corresponding to a plurality of transport machines available to the robot on the basis of the robot information and the transport-machine information, and decide a transport machine to be used on the basis of the calculated scores.

(18) A program for causing an information processing device to execute information processing, the information processing device including a data processing section that selects a transport machine to be taken by a robot,
 the program causing the data processing section to execute:
 a process of acquiring robot information that is about the robot and transport-machine information that is about the transport machine; and
 a process of calculating scores corresponding to a plurality of available transport machines on the basis of the acquired information, and selecting a transport machine to be used on the basis of the calculated scores.

Further, the series of processes explained herein can be executed by hardware, software, or a composite structure thereof. In a case where the processes are executed by software, a program having a sequence of the processes recorded therein can be executed after being installed into a memory of a computer incorporated in dedicated hardware, or can be executed after being installed into a general-purpose computer capable of various processes. For example, such a program can be previously recorded in a recording medium. The program can be installed into the computer from the recording medium. Alternatively, the program can be received over a network such as a LAN (local Area Network) or the internet, and be installed into a recording medium such as an internal hard disk.

In addition, the processes described herein are not necessarily executed in the described time-series order, and the processes may be executed in parallel or separately, as needed or according to a processing capacity of a device to execute the processes. Further, in the present specification, a system refers to a logical set structure including a plurality of devices, and the devices in the structure are not necessarily included in the same casing.

INDUSTRIAL APPLICABILITY

As explained so far, with the configuration according to one embodiment of the present disclosure, a configuration for deciding a transport machine to be taken by a robot by taking the efficiency and cooperativeness into consideration is achieved.

Specifically, a data processing section that selects a transport machine to be taken by a robot is included, for example. The data processing section acquires robot information that is about the robot and transport-machine information that is about the transport machine, calculates scores corresponding to a plurality of available transport machines on the basis of the acquired information, and selects a transport machine to be used on the basis of the calculated scores. In a case where two or more transport machines satisfy physical conditions for permitting the robot to take the transport machines, the data processing section calculates an efficiency calculation value and a cooperativeness calculation value based on the robot information and the transport-machine information, and calculates scores on the basis of a function using the calculated efficiency calculation value and the calculated cooperativeness calculation value.

With the present configuration, a configuration for deciding a transport machine to be taken by a robot by taking the efficiency and cooperativeness into consideration is achieved.

REFERENCE SIGNS LIST

10: Automatic traveling robot
20: User
21 to 23: Sensor
30: Upper unit
31: Blinker
32: Display section
33: Microphone
34: Stop button
35: Loudspeaker
36: Delivery-article housing section
70: Robot management server
71: Robot information database
72: Transport-machine information database
80: Building management server
101: Control section
102: Input section
103: Output section
104: Sensor group
105: Driving section
106: Communication section
107: Storage section
301: CPU
302: ROM
303: RAM
304: Bus
305: Input/output interface
306: Input section
307: Output section
308: Storage section
309: Communication section
310: Drive
311: Removable medium

The invention claimed is:

1. An information processing device, comprising:
a central processing unit (CPU) configured to:
receive information from a plurality of sensors;
update robot information and transport-machine information based on the received information, wherein
the robot information is regarding a robot that includes a driving section,
the transport-machine information is regarding each of a first plurality of transport machines,
the robot information includes appearance information of the robot, and
the robot information and the transport-machine information are stored in a robot management database;
acquire the updated robot information and the transport-machine information stored in the robot management database;
select, based on the appearance information of the robot, a transport machine of the first plurality of transport machines usable by the robot;
determine, based on the selected transport machine, a riding position of the robot in the transport machine;
determine guide information based on the determined riding position of the robot in the transport machine;
control to display the guide information on a display section of the robot, wherein the guide information indicates the determined riding position of the robot and a position of at least one occupant in the selected transport machine before the robot enters the selected transport machine; and
control the driving section to move the robot to the determined riding position of the robot in the transport machine.

2. The information processing device according to claim 1, wherein
the CPU is further configured to determine at least one transport machine of the first plurality of transport machines that satisfies a physical condition,
the physical condition is regarding a condition that enables the robot to use the transport machine,
in a case where one transport machine of the first plurality of transport machines satisfies the physical condition, the CPU is further configured to select the one transport machine as the transport machine usable by the robot, and
in a case where a second plurality of transport machines of the first plurality of transport machines satisfy the physical condition, the CPU is further configured to:
determine a score corresponding to each of the second plurality of transport machines, and
select, based on the determined score for each of the second plurality of transport machines, the transport machine usable by the robot.

3. The information processing device according to claim 1, wherein the CPU is further configured to:
calculate an efficiency calculation value and a cooperativeness calculation value based on the robot information and the transport-machine information, and determine a score for each of the first plurality of transport machines based on a function of the calculated efficiency calculation value and the calculated cooperativeness calculation value.

4. The information processing device according to claim 3, wherein the CPU is further configured to determine the score for each of the first plurality of transport machines based on an expression:

$$\text{score} = a \times (\text{efficiency calculation value}) + b \times (\text{cooperativeness calculation value})$$

where a and b represent a multiplication coefficient.

5. The information processing device according to claim 3, wherein
the CPU if further configured to calculate the efficiency calculation value based on at least one of a number of times by which the transport machine makes stop or a time to get in and out the transport machine.

6. The information processing device according to claim 3, wherein
the CPU if further configured to calculate the cooperativeness calculation value based on at least one of a visual burden on a user of the transport machine, a sensitive burden on the user, or an affinity of the user.

7. The information processing device according to claim 1, wherein
the robot information further includes at least one of movement information, weight information, occupation region information, or route information of the robot.

8. The information processing device according to claim 1, wherein
the transport-machine information further includes at least one of movement information, weight information, or occupation region information of each of the first plurality of transport machines.

9. The information processing device according to claim 1, wherein, the CPU is further configured to:
execute a decided-riding-position notifying process based on the determined riding position.

10. An information processing system, comprising:
a robot that includes a driving section;
a robot management server; and
a building management server, wherein
the robot is configured to:
receive first information from a plurality of sensors, and
transmit the first information to the robot management server,
the building management server is configured to:
receive second information from the plurality of sensors, and
transmit the second information to the robot management server, and
the robot management server is configured to:
receive the first information and the second information,
update robot information based on the received first information, wherein the robot information is regarding the robot,
update transport-machine information based on the received second information, wherein the transport-machine information is regarding each of a first plurality of transport machines, wherein at least one of the first information or the second information includes appearance information of the robot,
select, based on the appearance information of the robot, a transport machine of the first plurality of transport machines usable by the robot,
determine, based on the selected transport machine, a riding position of the robot in the transport machine,
determine guide information based on the determined riding position of the robot in the transport machine,
control to display the guide information on a display section of the robot, wherein the guide information indicates the determined riding position of the robot and a position of at least one occupant in the selected transport machine before the robot enters the selected transport machine, and
control the driving section to move the robot to the determined riding position of the robot in the transport machine.

11. The information processing system according to claim 10, wherein
the robot management server is further configured to determine at least one transport machine of the first plurality of transport machines that satisfies a physical condition,
the physical condition is regarding a condition that enables the robot to use the transport machine,
in a case where one transport machine of the first plurality of transport machines satisfies the physical condition, the robot management server is further configured to select the one transport machine as the transport machine usable by the robot, and
in a case where a second plurality of transport machines of the first plurality of transport machines satisfy the physical condition,
the robot management server is further configured to:
determine a score corresponding to each of the second plurality of transport machines, and
select, based on the determined score for each of the second plurality of transport machines, the transport machine usable by the robot.

12. The information processing system according to claim 10, wherein the robot management server is further configured to:
calculate an efficiency calculation value and a cooperativeness calculation value based on the robot information and the transport-machine information, and
determine a score for each of the first plurality of transport machines based on a function of the calculated efficiency calculation value and the calculated cooperativeness calculation value.

13. A non-transitory computer-readable medium having stored thereon, computer-executable instructions which, when executed by a central processing unit (CPU), cause the CPU to execute operations, the operations comprising:
receiving information from a plurality of sensors,
updating robot information and transport-machine information based on the received information, wherein
the robot information is regarding a robot that includes a driving section,
the robot information includes appearance information of the robot,
the transport-machine information is regarding each of a plurality of transport machines, and
the robot information and the transport-machine information are stored in a robot management database;

acquiring the updated robot information and the transport-machine information stored in the robot management database;

selecting, based on the appearance information of the robot, a transport machine of the plurality of transport machines usable by the robot;

determining, based on the selected transport machine, a riding position of the robot in the transport machine;

determining guide information based on the determined riding position of the robot in the transport machine;

controlling to display the guide information on a display section of the robot, wherein the guide information indicates the determined riding position of the robot and a position of at least one occupant in the selected transport machine before the robot enters the selected transport machine; and controlling the driving section to move the robot to the determined riding position of the robot in the transport machine.

14. The information processing device according to claim 1, wherein the appearance information of the robot indicates at least one of dirt on the robot or a presence or absence of protrusions.

15. The information processing device according to claim 1, wherein the CPU is further configured to select, based on occupant information of each of the first plurality of transport machines, the transport machine of the first plurality of transport machines usable by the robot.

16. The information processing device according to claim 15, wherein the CPU is further configured to determine an object of the robot is a person based on the received information from the plurality of sensors, and the occupant information is corresponding to the determined object as the person.

17. The information processing device according to claim 1, wherein the CPU is further configured to execute, based on the selected transport machine usable by the robot, a decision-information notifying process.

* * * * *